United States Patent [19]

Takahashi et al.

[11] Patent Number: 5,093,161

[45] Date of Patent: Mar. 3, 1992

[54] METHOD OF ADHERING SILICONE RUBBER TO A COATED METAL SURFACE

[75] Inventors: Masaharu Takahashi, Annaka; Jun Hatakeyama, Tsukuba, both of Japan

[73] Assignee: Shin-Etsu Chemical Co., Ltd., Tokyo, Japan

[21] Appl. No.: 588,059

[22] Filed: Sep. 25, 1990

[30] Foreign Application Priority Data

Sep. 26, 1989 [JP] Japan .................. 1-249605
Sep. 26, 1989 [JP] Japan .................. 1-249606

[51] Int. Cl.$^5$ ............................. B05D 3/12
[52] U.S. Cl. ............................ 427/369; 427/370; 427/387; 427/409; 528/32
[58] Field of Search ........ 528/32; 427/387, 369, 427/370, 409

[56] References Cited

U.S. PATENT DOCUMENTS 4,725,648  2/1988  Fujimoto et al. .............. 528/32
4,777,063 10/1988  Dubrow et al. ................ 528/24

Primary Examiner—Melvyn I. Marquis
Assistant Examiner—Margaret W. Glass
Attorney, Agent, or Firm—Oblon, Spivak, McClelland, Maier & Neustadt

[57] ABSTRACT

Silicone rubber is adhered to a metal surface by coating the metal surface with an organopolysiloxane adhesion improving agent of the formula:

$$(R^1)_a(R^2)_b SiO_{\frac{4-a-b}{2}} \quad (I)$$

wherein $R^1$ is a monovalent organic radical of from 2 to 8 carbon atoms which contains an unsaturated bond, $R^2$ is a substituted or unsubstituted monovalent hydrocarbon radical of from 1 to 10 carbon atoms which contains no unsaturated bond, a is a number in the range of $1 < a < 4$, and b is a number in the range of $0 \leq b < 2$, with the proviso that $a+b$ is $< 4$, and having a polymerization degree of from 2 to 1000, placing an unvulcanized silicone rubber on the coated surface, and vulcanizing the unvulcanized rubber.

7 Claims, 1 Drawing Sheet

METHOD OF ADHERING SILICONE RUBBER TO A COATED METAL SURFACE

BACKGROUND OF THE INVENTION

1. Field of the Invention

This invention relates to an adhesion improving agent, and more particularly to an adhesion improving agent useful for improving the adhesion between a metal and a silicone rubber.

2. Description of the Prior Art

Silicone rubbers are used for a wide variety of purposes, because of their excellent properties. The silicone rubbers are also used in the form of a composite obtained by adhesion of a silicone rubber to a metal. In producing such a composite, it is a common practice to pretreat the surface of the metal with a primer in order to achieve firm adhesion between the silicone rubber and the metal.

As the primer, there have been proposed a composition comprising an alkoxysilane having an unsaturated bond or a hydrolysis-condensation product thereof or a co-hydrolysis-condensation product of two or more alkoxysilanes, a titanic acid ester, and a metal salt of an organic fatty acid [Japanese Patent Publication (KOKOKU) Nos. 62-17622 (1987) and 62-17623 (1987)]; a composition comprising an alkoxysilane having an unsaturated bond or a hydrolysis-condensation product thereof or a co-hydrolysis-condensation product of two or more alkoxysilanes, a titanic acid ester, a metal salt of an organic fatty acid, and an organosilicon compound having a Si—H radical [Japanese Patent Publication (KOKOKU) No. 61-2107 (1986)]; a rubber-like composition comprising a vinyl group-containing organopolysiloxane, a polysiloxane resin, an alkoxysilane, an organic peroxide, and a titanic acid ester [Japanese Patent Publication (KOKOKU) No. 56-39817 (1981)], and so on.

In the processes of adhering a silicone rubber and a metal to each other by use of the conventional primers, however, a complicated adhering operation has been required; for instance, an air-drying or baking step has been essentially required for evaporating off a solvent to solidify the primer, after application of the primer to the adherend. Furthermore, the conventional primers contain the hydrolysis-condensation product, a catalyst or a solvent, which may cause a safety problem in the preparation of the primers.

SUMMARY OF THE INVENTION

An object of this invention is to provide an adhesion improving agent suitable for improving the adhesion between a silicone rubber and a suitable such as a metal, which enables an easy adhering operation as well as an easy and safe production of a bonded structure.

According to this invention, there is provided an adhesion improving agent comprising an organopolysiloxane having the following general composition formula (I):

$$(R^1)_a(R^2)_b SiO_{\frac{4-a-b}{2}} \qquad (I)$$

wherein
$R^1$ is a monovalent organic radical of from 2 to 8 carbon atoms which contains an unsaturated bond, $R^2$ a substituted or unsubstituted monovalent hydrocarbon radical of from 1 to 10 carbon atoms which contains no unsaturated bond, a is a number in the range $1 < a < 4$, and b is a number in the range $0 \leq b < 2$, with the proviso that $a + b < 4$, and having a polymerization degree of from 1 to 1,000.

The adhesion improving agent according to this invention does not contain any of hydrolysis-condensation product, catalyst and solvent. By applying the adhesion improving agent to an adherend, such as a metal, or by incorporating the adhesion improving agent in a silicone rubber compound to be adhered, it is possible to improve easily the adhesion between the adherend and the silicone rubber. Thus, the above-mentioned object of this invention is attained.

DETAILED DESCRIPTION OF PREFERRED EMBODIMENTS

Organopolysiloxane

Figure 1:
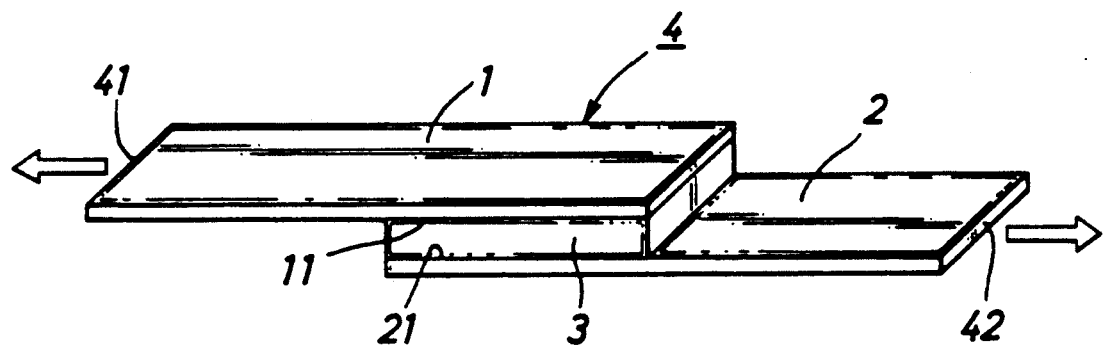
FIG. 1 illustrates a specimen used for measurement of adhesive strength in Examples and Comparative Examples which will be described later.

The organopolysiloxane, constituting the adhesion improving agent of this invention, is represented by the above-mentioned general composition formula (I). In the formula (I), $R^1$ is a monovalent organic radical of from 2 to 8 carbon atoms which contains an unsaturated bond. Radicals which can be used as $R^1$ include, for example, alkenyl radicals such as vinyl, allyl, butenyl etc., aryl radicals such as phenyl, tolyl, etc., (meth)acryloyl, and so on, of which preferred are alkenyl radicals, and most preferred is the vinyl radical.

$R^2$ in the general composition formula (I) is a substituted or unsubstituted monovalent hydrocarbon radical of from 1 to 10 carbon atoms which contains no unsaturated bond. Examples of $R^2$ include alkyl radicals such as methyl, ethyl, propyl, butyl, etc.; cycloalkyl radicals such as cyclohexyl, etc.; and radicals corresponding to the just mentioned radicals in which some or all of the carbon-bonded hydrogen atoms are substituted by halogen atoms, cyano radicals or the like, for example, chloromethyl, γ-trifluoropropyl, cyanoethyl, and so on.

a and b in the formula (I) are numbers in the respective ranges of $1 < a < 4$ and $0 \leq b < 2$, with the proviso that $a + b < 4$. From the viewpoint of heat resistance, particularly, a is preferably a number in the range $1.8 \leq a \leq 2.2$.

In this invention, further, the polymerization degree (i.e., the number of the silicon atoms in a molecule) of the organopolysiloxane is from 1 to 1,000, preferably from 1 to 10. If the polymerization degree exceeds 1,000, the adhesion-improving effect aimed at by this invention is lowered.

The organopolysiloxane may have any of straight-chain, branched, cyclic and network molecular structures, and the radical $R^1$ containing an unsaturated bond may be located at either of an end of the molecular chain of the organopolysiloxane and an intermediate point in the molecular chain. The particularly preferred organopolysiloxanes in this invention include, for example, the organopolysiloxanes represented by the following formulas. Herein, Vi represents the vinyl radical, and Me represents the methyl radical.

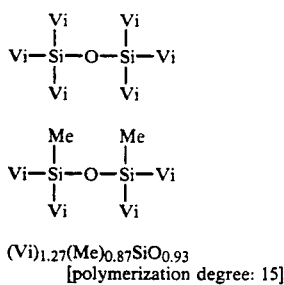

(Vi)$_{1.27}$(Me)$_{0.87}$SiO$_{0.93}$
[polymerization degree: 15]

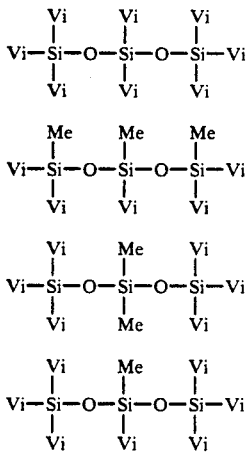

Use

The adhesion improving agent of this invention comprising the organopolysiloxane as described above, when applied, for example, to a metal surface as a primer, is capable of improving the adhesion between the metal surface and a silicone rubber. Also, when incorporated in a silicone rubber compound, the adhesion improving agent of this invention provides a self-adhesive rubber composition which shows excellent adhesive properties, particularly to metal surfaces. The metals the adhesion of which can thus be improved by the adhesion improving agent of this invention are not particularly limited. For instance, the adhesive properties of silicone rubbers for adhesion to iron, aluminum, nickel, chromium, zinc, tin, copper, alloys of these metals, stainless steel, etc., can be enhanced effectively by the adhesion improving agent of the invention.

Primer:

Where the adhesion improving agent of this invention is used as a primer to be applied to a metal surface, the primer can contain, in addition to the adhesion improving agent of this invention, a variety of additives such as an inorganic filler, a heat resistance improving agent, a coloring agent, etc., as required, insofar as the effect of this invention is not impaired. The additives suitable for such a use include, for example, powdery silica, red iron oxide, cerium oxide, cerium hydroxide, fatty acid salts of cerium, fatty acid salts of iron, titanium oxide, carbon black, etc.

The silicone rubbers which can be improved in adhesion to the metal surfaces by treatment with the primer include, for example, thermosetting silicone rubbers employing an organic peroxide as a curing catalyst, addition-curing type curable silicone rubbers, etc. The thermosetting silicone rubbers with an organic peroxide as a curing catalyst include, for example, silicone rubber compositions containing as a main constituent a diorcompositions containing as a main constituent a diorganopolysiloxane which is blocked by the hydroxyl radical or a triorganosilyl radical, such as trimethylsilyl, vinyldimethylsilyl, divinylmethylsilyl, vinylmethylphenylsilyl, etc., at an end of its molecular chain and which has a viscosity of from about 1,000,000 to about 10,000,000 cP at 25° C. The addition-curing type curable silicone rubbers include, for example, silicone rubber compositions which comprise a diorganopolysiloxane having at least two silicon-bonded vinyl radicals per molecule and an organohydrogenpolysiloxane having at least two silicon-bonded hydrogen atoms per molecule.

The process of adhesion between a silicone rubber and a metal through the primer treatment can be carried out by coating the metal surface with the primer containing the adhesion improving agent of this invention, placing a unvulcanized silicone rubber on the primer-coated surface, and vulcanizing the unvulcanized silicone rubber by an appropriate method selected according to the silicone rubber used. The coating weight of the primer is generally from 0.5 to 5 g/cm², preferably from about 1 to about 2 g/cm².

The above adhesion process can be carried out without use of a solvent. Therefore, there is no need for drying or the like treatments, and the adhesion process is also effective in regard to safety.

Self-adhesive rubber composition:

As described above, the adhesion improving agent of this invention, when incorporated in a silicone rubber compound, gives a self-adhesive rubber composition having excellent adhesive properties, particularly for adhesion to a metal surface.

As the silicone rubber compound, organic peroxide-curable type silicone rubber compounds are the most preferable. One typical example of the organic peroxide-curable type silicone rubber compounds is a composition (1) diorganopolysiloxane,
(2) a powdery silica filler, and
(3) an organic peroxide as essential ingredients.

The diorganopolysiloxane as the first ingredient may be, for example, a diorganopolysiloxane represented by the following general composition formula (II):

wherein $R^3$, which may be identical a substituted or unsubstituted monovalent hydrocarbon radical of from 1 to 10, preferably from 1 to 8, carbon atoms which is selected from alkyl radicals such as methyl, ethyl, propyl, butyl, etc.; alkenyl radicals such as vinyl, allyl, butenyl, etc.; aryl radicals such as phenyl, tolyl, etc.; aralkyl radicals such as benzyl and 2-phenylethyl; radicals corresponding to the just mentioned radicals in which part or all of the carbon-bonded hydrogen atoms are substituted by a halogen atom, the cyano radical or the like, for example, chloropropyl, 3,3,3-trifluoropropyl or 2-cyanoethyl, and so on; c is a number of from 1.95 to 2.05.

Typical examples of the diorganopolysiloxane represented by the above formula (II) are those in which at least 98 mol % of the $R^3$ radicals in the formula are alkyl radicals of from 1 to 4 carbon atoms, particularly methyl, and the rest of the $R^3$ radicals contain vinyl, phenyl or tri-fluoropropyl radicals. The diorganopolysiloxane preferably has a straight-chain molecular structure, but a branched chain may be present as part of the molecules. The polymerization degree of the diorganopolysiloxane may generally be from 3,000 to 30,000, and a polymerization degree of from 4,000 to 10,000 is preferred from the viewpoint of processability.

The powdery silica filler as the second ingredient of the silicone rubber compound is added to the silicone rubber for the purposes of reinforcement, thickening, improvement of processability, and extension. Examples of the powdery silica filler include fumed silica, wet-process silica, fumed or wet-process silica surface-treated to be hydrophobic, fine powder of quartz, diatomaceous earth, etc. The powdery silica filler may further contain other forms of filler, such as calcium silicate, calcium carbonate, carbon black, glass fiber, etc., in small amounts. Preferably, the fillers have specific surface area of at least 1 m$^2$/g, more preferably at least 50 m$^2$/g. If the compounding amount of the powdery silica filler is too small, the intended reinforcing property is not obtained and, also, processability of the silicone rubber compound is unsatisfactory. Too large a compounding amount, on the other hand, causes a marked lowering in processability such as flowability in molds, dischargeability, etc. Generally, the amount of the powdery silica filler is preferably from 10 to 300 parts by weight, more preferably form 25 to 200 parts by weight, per 100 parts by weight of the diorganopolysiloxane used as the first ingredient.

The organic peroxide usable as the third ingredient of the silicone rubber compound includes, for example, t-butyl peroxide, dicumyl peroxide, benzoyl peroxide, monochlorobenzoyl peroxide, p-methylbenzoyl peroxide, 2,4-dichlorobenzoyl peroxide, t-butyl perbenzoate, 2,5-bis(t-butylperoxy)-2,5-dimethylhexane, 2,5-(t-butylperoxy)-2,5-dimethylhexyne; dimyristyl peroxycarbonate, dicarbonates such as dicyclododecyl peroxydicarbonate; t-butyl monoperoxycarbonates and the compounds represented by the following formula:

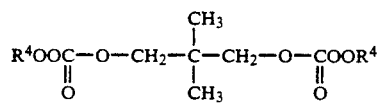

wherein R$^4$ is a substituted or unsubstituted monovalent hydrocarbon radical of from 3 to 10 carbon atoms, for example, n-propyl, isopropyl, n-butyl, t-butyl, hexyl, octyl, 3,3,3-trichloropropyl and 3,3,3-trifluoropropyl groups, or a triorganosilyl group. These organic peroxides may be used either singly or in combination of two or more. The compounding amount of the peroxide is generally from 0.1 to 5 parts by weight, preferably from 0.5 to 2 parts by weight, per 100 parts by weight of the diorganopolysiloxane used as the first ingredient.

The amount of the adhesion improving agent blended into the organic peroxide-curable type silicone rubber compound described above is generally from 0.1 to 10 parts by weight, preferably from 1 to 7 parts by weight, per 100 parts by weight of the silicone compound. The blending of the adhesion improving agent into the silicone compound can be carried out easily through kneading by use of an appropriate means, for instance, a twin roll mill, a mixing kneader or a Banbury mixer.

Into the self-adhesive rubber composition thus formed, additives such as heat resistance improving agent, coloring agent, etc., can be incorporated as required, similarly to the case of using the primer described above.

The self-adhesive rubber composition shows excellent adhesive properties, particularly to metal surfaces, and can be adhered firmly to a metal surface without using any special primer or the like. Adhesion between the self-adhesive rubber composition and a metal can be achieved easily by pressing the rubber composition against the metal surface and vulcanizing the rubber composition by an appropriate method. The pressure used in the pressing is generally about 10 to 100 kgf/cm$^2$. The vulcanization is generally carried out at a temperature of about 120 to about 200° C. for about 2 to 30 minutes.

EXAMPLES

This invention will now be explained in detail by referring to non-limitative Examples and Comparative Examples.

Examples 1 to 3, and Comparative Examples 1 and 2

In each example, a silicone rubber was adhered to a steel sheet using one of the organopolysiloxanes represented by the formulas (A),(B) and (C) below and the following composition formulas (D) and (E) below as a primer, and the adhesive strength was measured, according to the method described below.

Example 1

wherein Vi is the vinyl radical (the same applies hereinbelow).

Example 2

wherein Me is the methyl radical (the same applies hereinbelow).

Comparative Example 1

Example 3

[polymerization degree: 15]

Comparative Example 2

[polymerization degree: 1,200]

Adhesive strength

A mixture of 100 parts by weight of a silicone rubber (KE555U, a product by Shin-Etsu Chemical Co., Ltd.) and 0.5 part by weight of 2,5-dimethyl-2,5-bis(t-butylperoxyhexane) was kneaded by a twin roll mill, to obtain an unvulcanized rubber.

Two steel sheets measuring 0.3×25×50 mm and having surfaces cleaned with gasoline were each coated with a primer on one side thereof. Next, as shown in FIG. 1, the primer-coated sides 11 and 21 of the steel sheets 1 and 2 were opposed to each other, with an overlapping area of 1 in$^2$ and with the unvulcanized rubber placed therebetween. The resultant assembly was subjected to press curing under a pressure of 50 kg/cm$^2$ at 165° C. for 10 minutes, to prepare a test specimen 4 comprising the steel sheets 1 and 2 adhered to each other, with the cured product 3 of the rubber therebetween.

End portions 41 and 42 of the test specimen 4 thus obtained were attached to chucks of a tensile testing machine. A tensile load was applied in the direction of the arrow in FIG. 1 at a rate of 1 mm/min, and the maximum tensile load reached before the rupture of the test specimen was measured, as adhesive strength. Also the condition of the ruptured portion of the test specimen was examined. The results are shown in Table 1.

TABLE 1

| | Primer | Adhesive strength (kgf/cm$^2$) | Condition of rupture |
| --- | --- | --- | --- |
| Example | | | |
| 1 | (A) | 24 | rupture of rubber |
| 2 | (B) | 23 | rupture of rubber |
| 3 | (D) | 15 | rupture of rubber |
| Comparative Example | | | |
| 1 | (C) | 10 | delamination at interface* |
| 2 | (E) | 11 | delamination at interface* |

*Interface between rubber and steel sheet.

Examples 4 to 6, and Comparative Examples 3 and 4

A mixture of 100 parts by weight of a silicone rubber compound (KE555U, a product by Shin-Etsu Chemical Co., Ltd.) and 0.5 part by weight of 2,5-bis(t-butylperoxy)-2,5-dimethylhexane was kneaded by use of a twin roll mill to obtain a unvulcanized rubber.

Next, five compositions were prepared by mixing 2 g of one of the five organopolysiloxanes represented by the above formulas (A) to (C) and the average composition formulas (D) and (E) with 100 g of the unvulcanized rubber, followed by kneading by a twin roll mill. More specifically, in Example 4, the organopolysiloxane of (A) was used; in Example 5, the organopolysiloxane of (B); in Example 6, the organopolysiloxane of (D); in Comparative Example 3, the organopolysiloxane of (C); and in comparative Example 4, the organopolysiloxane of (E).

The five compositions thus obtained were subjected to measurement of adhesive strength, according to the adhesion test conducted in Examples 1 to 3 and Comparative Examples 1 and 2. That is, each of the five compositions was used in place of the unvulcanized rubber used in the above adhesion tests, but the primer was not used. The results are shown in Table 2.

TABLE 2

| | Adhesion improving agent | Adhesive strength (kgf/cm$^2$) | Condition of rupture |
| --- | --- | --- | --- |
| Example | | | |
| 4 | (A) | 23 | rupture of rubber |
| 5 | (B) | 22 | rupture of rubber |
| 6 | (D) | 12 | rupture of rubber |
| Comparative Example | | | |
| 3 | (C) | 8 | delamination at interface* |
| 4 | (E) | 9 | delamination at interface* |

*Interface between rubber and steel sheet.

We claim:

1. A method for adhesion of a silicone rubber, which comprises: coating a metal surface with an organopolysiloxane adhesion improving agent of the formula:

wherein R$^1$ is a monovalent organic radical of from 2 to 8 carbon atoms which contains an unsaturated bond, R$^2$ is a substituted or unsubstituted monovalent hydrocarbon radical of from 1 to 10 carbon atoms which contains no unsaturated bond, a is a number in the range of 1<a<4, and b is a number in the range of 0≦b<2, with the proviso that a+b<4, and having a polymerization degree of from 2 to 1,000;

placing an unvulcanized silicone rubber on the coated surface; and vulcanizing the unvulcanized rubber.

2. The method of claim 1, wherein vulcanizing occurs at an elevated temperature of from about 120 to about 200° C. for 2 to 30 minutes.

3. The method of claim 1, wherein said silicone rubber is placed in contact with said coated surface under a pressure of 10 to 100 kgf/cm$^2$, thereby achieving adhesion of the silicone rubber to said surface.

4. The method of claim 1, wherein R$^1$ is an alkenyl radical.

5. The method of claim 4, wherein said alkenyl radical is a vinyl radical.

6. The method of claim 1, wherein a is within the range of 1.8≦a≦2.2.

7. The method of claim 1, wherein said organopolysiloxane has a polymerization degree of from 2 to 10.

* * * * *